(12) United States Patent
Fathollahi

(10) Patent No.: US 10,003,370 B2
(45) Date of Patent: Jun. 19, 2018

(54) PROTECTIVE CASE FOR MOBILE DEVICE WITH DISPLACED CAMERA CONTROL

(71) Applicant: Incipio Technologies, Inc., Irvine, CA (US)

(72) Inventor: Andy Fathollahi, Corona Del Mar, CA (US)

(73) Assignee: Incipio, LLC, Irvine, CA (US)

( * ) Notice: Subject to any disclaimer, the term of this patent is extended or adjusted under 35 U.S.C. 154(b) by 52 days.

(21) Appl. No.: 14/582,146

(22) Filed: Dec. 23, 2014

(65) Prior Publication Data

US 2015/0180527 A1 Jun. 25, 2015

Related U.S. Application Data

(60) Provisional application No. 61/920,721, filed on Dec. 24, 2013.

(51) Int. Cl.
*H04B 1/38* (2015.01)
*H04M 1/00* (2006.01)
(Continued)

(52) U.S. Cl.
CPC ............ *H04B 1/3888* (2013.01); *H04M 1/04* (2013.01); *H04M 1/185* (2013.01)

(58) Field of Classification Search
CPC .................................................. H04M 1/3888
(Continued)

(56) References Cited

U.S. PATENT DOCUMENTS

| 7,221,559 | B1 * | 5/2007 | Duarte | .................. | G06F 1/1624 |
| | | | | | 361/679.02 |
| 8,439,191 | B1 * | 5/2013 | Lu | ........................ | H04B 1/3888 |
| | | | | | 206/320 |

(Continued)

OTHER PUBLICATIONS

Nick Guy, "Review: Incipio Focal Camera Case for iPhone 5/5s," May 27, 2014, http://www.ilounge.com/index.php/reviews/entry/incipio-focal-camera-case-for-iphone-5-5s.

*Primary Examiner* — Tilahun B Gesesse
(74) *Attorney, Agent, or Firm* — Manatt, Phelps & Phillips, LLP

(57) ABSTRACT

A protective case for a mobile device having an alternative user interface that is capable of wirelessly controlling the operations of the mobile device is disclosed. The alternative user interface is displaced from the corresponding user interface on the mobile device and is programmable and paired or otherwise wirelessly connected to the mobile device via a Bluetooth or other suitable wireless interface or protocol. A software application residing on the mobile can facilitate wireless operation of the mobile device features by the additional user interface on the case. Wireless user control via the alternative user interface controls on the case, for example, may be of one or more of the operations of a camera feature of the mobile device or may be any other operation of the mobile device. The protective case can be formed of multiple components that are user separable from another to allow for modular and independent functionality. An additional flash/lamp feature on the case is provided to improve flash and/or lighting and a stand feature is provided on the case to allow the case to stand the mobile device in a desired position and orientation while taking a photograph remotely with the user controls on a separated component of the case.

13 Claims, 14 Drawing Sheets

(51) Int. Cl.
*H04B 1/3888* (2015.01)
*H04M 1/04* (2006.01)
*H04M 1/18* (2006.01)

(58) Field of Classification Search
USPC .................................. 455/575.8, 344, 345
See application file for complete search history.

(56) References Cited

U.S. PATENT DOCUMENTS

| | | | |
|---|---|---|---|
| 8,825,123 B1* | 9/2014 | Gudino | A45C 11/00 |
| | | | 348/333.01 |
| 9,160,831 B2* | 10/2015 | Jang | H04M 1/0245 |
| 2008/0227505 A1* | 9/2008 | Jang | H04M 1/0245 |
| | | | 455/575.1 |
| 2011/0228458 A1* | 9/2011 | Richardson | H04M 1/0252 |
| | | | 361/679.01 |
| 2012/0270600 A1* | 10/2012 | Zelson | H04B 1/3888 |
| | | | 455/556.1 |
| 2012/0282977 A1* | 11/2012 | Haleluk | H04B 1/3888 |
| | | | 455/556.1 |
| 2013/0206614 A1* | 8/2013 | O'Neill | H04B 1/3888 |
| | | | 206/216 |

* cited by examiner

PROTECTIVE CASE FOR MOBILE DEVICE WITH DISPLACED CAMERA CONTROL

INCORPORATION BY REFERENCE TO RELATED APPLICATIONS

This application claims benefit under 35 U.S.C. § 119(e) from U.S. Provisional Application No. 61/920,721, filed on Dec. 24, 2013, the disclosure of which is incorporated herein by reference in its entirety.

BACKGROUND OF THE INVENTION

Field of the Invention

This patent document relates to user removable protective enclosures or cases for mobile devices. More particularly the subject matter of this patent document relates to such cases that have displaced wireless control over one or more operations of the mobile device, such as the operations of a camera feature on a smart phone.

Description of the Related Art

Mobile devices are known to sustain damage from impact, such as from a fall or being dropped by a user and from contamination, such as when damaged by water or other fluid. The damage, for example, may result in a cracked screen, scratches on a finished surface, lost or damaged buttons or controls, cracked or bent external body components, and/or failed or malfunctioning electrical components. Cases have thus been provided to protect mobile devices from such and variant types of damage.

Mobile devices, such as smart phones, tablets and the like, have many built-in features and are increasingly being equipped with built-in camera features. Indeed, it has been reported that nearly one third of all photos are now taken by smart phones. Ergonomically, camera equipped smart phones, however, are not typically optimized for use as cameras in that often times the shutter button or control is not optimally positioned.

For example, shutter control for the camera feature in the iPhone® 5 by Apple® is activated by pressing the plus ("+") volume control button or tapping the camera shutter button on the screen adjacent the home button. The camera lens is located near the perimeter on the same end of the phone as the volume control button that controls the shutter. Thus, when using the plus volume control button to trigger the camera shutter, it is not uncommon for one or more of the user's fingers to obstruct the camera lens. Alternatively, when using the shutter button in the camera application, it is not uncommon for users to hold the phone on one end (the end where the camera lens is located) with only a single hand and press the shutter button with the free hand on the other end near the home button. Because the user is only holding the phone with one hand, on one end of the phone, around the perimeter, the phone is often unstable, such that when the shutter button on the screen is tapped by the user it tends to move. Zooming by pinching the screen or tapping the screen to select a flash option (e.g., on or off) can also move and destabilize the shot. In either mode of operation, the quality of the photo can be significantly diminished or lost all together, especially in low light conditions. As many smart phone users can attest, the experience can be quite frustrating and can lead to damage of the device by dropping the device unintentionally while attempting to manipulate the device and camera feature options to take a quality photograph.

Accordingly, it is here recognized that there is a need for protective cases for mobile devices that are capable of providing improved safety and user control over one or more operations of the mobile devices and that such user control be wirelessly connected to the mobile device.

SUMMARY OF THE INVENTION

There exists a continuing need for new and improved designs for cases for mobile devices that provide protection to the mobile device while also providing displaced user control over the operation of the mobile device.

Disclosed is a unique and inventive protective case configured to receive and protect a mobile device wherein said case includes an additional user interface control over an operation of the mobile device. In one aspect the user interface control is displaced from the corresponding controls of the mobile device. In another aspect the user interface control is wirelessly connected to the mobile device, such as with a Bluetooth interface such as a Bluetooth low energy ("BLE") interface. While BLE may be employed to implement the connectivity between the case and the mobile device, it should be understood that any suitable wireless interface may be used, including standard Bluetooth or industrial, scientific and medical (ISM) radio bands for RF. In yet another aspect, the user interface control may control any user controlled operation of the mobile device including for example the operations of the camera feature (such as the shutter activation and zoom features) and may be positioned on the case in a location that is capable of improving the ergonomics for the user. In a further aspect, the user interface control may have one or more buttons or switches or other interfaces and may have status indicator lights to provide visual notification to the user. One or more of the user interfaces of the displaced user control may be programmable. The programmable control may for example allow the user to select a flash option or change from camera to video mode by pressing a programmable button, which can be pre-set to behave as a flash toggle or camera mode toggle switch. In yet another further aspect, the protective case may be formed of one or more enclosure components that individually or collectively securely surround, in whole or in part, the mobile device and/or perimeter thereof. When formed of multiple components, the components may be adapted to being connected to one another in a reversible locking connection that allows the user to detach the components from each and/or the mobile device. In yet another aspect, the protective case may include another camera flash or light component that is controlled or triggered with the operation of the camera shutter activation. The flash or light component may be remotely displaced relative to the flash/and or light component of the mobile device. In yet a further aspect, the protective case may also include a stand to allow positioning of the case and mobile device while also being able to remotely control the operation of the mobile device such as the operation of the camera shutter and zoom control of the camera. In a further aspect, the user interface control is comprised of printed circuit board that controls the operation of the mobile device via a wireless communication module such as a Bluetooth interface. In yet a further aspect, the user interface control interfaces with the mobile device through a software application that resides on the mobile device. In yet a further aspect, the software application can facilitate the interaction and operation of the mobile device via the user interface controls on the case and the programming of the user interface buttons/switches. In yet another aspect, the protective case provides user controls that allow the user to hold the mobile device with two hands while operating the shutter activation and the zoom control and selecting one or more camera feature operations. In yet a further aspect, the protective case includes an integrated grip, wrist-strap and shutter activation and zoom control buttons that are positioned to allow the user to securely hold the mobile device with two hands without obstructing the camera lends and/or flash. In yet another aspect, the user control module may be configured to be user removable from the case to allow the user to leave the mobile device in the case while using the controls to remotely control the operations of the mobile device, for example actuating the camera shutter remotely. The case may have a stand that facilitate positioning of the case in the desired location and angle to facilitate selfies using the removed control module as a remote control. The case may include a camera lens aperture which includes a lens accessory that is attached to the camera lens aperture, for example via threads, clips, latches, and/or other suitable mechanical or adhesive means. The camera lens accessory may include for example one or more additional convex, concave, flat, or colored lenses that may augment the camera feature. In yet a further aspect, the protective case with user control, mobile device, and user interface application residing thereon comprise a system.

Each of the foregoing various aspects, together with those set forth in the claims and described in connection with the embodiments of the protective cases summarized above or otherwise disclosed herein may be combined in devices, apparatuses, systems, methods of manufacture and/or uses in any way disclosed herein without limitation.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION OF THE PREFERRED EMBODIMENT

Disclosed herein is a protective case for a mobile device configured to facilitate displaced and wireless control over one or more operational features of a mobile device.

The inventors here recognize that mobile electronic devices, such as cellular and smart phones, lap tops, and tablets, and the like, have been and are increasingly being equipped with add on features and operations that were previously traditionally performed by standalone devices. With such multi-functionality, user ergonomics for controlling those features becomes more and more challenging to implement in a way that is optimum for each of multitude of features or operations.

The invention and teachings disclosed herein provide elegant and user customizable solutions that are capable of overcoming these ergonomic challenges by providing displaced and wireless control over one or more operational features of mobile device and doing so within a protective case for such device.

Commonly disclosed in FIGS. 1A-4B is an embodiment of a protective enclosure or case 200 for a mobile device 100. In this particular implementation the mobile device is an Apple iPhone 5s mobile or smart phone. It should be understood, however, that the mobile device may be any electronic device, such as a portable phone, PDA, laptop computer or tablet.

Figure 4A:
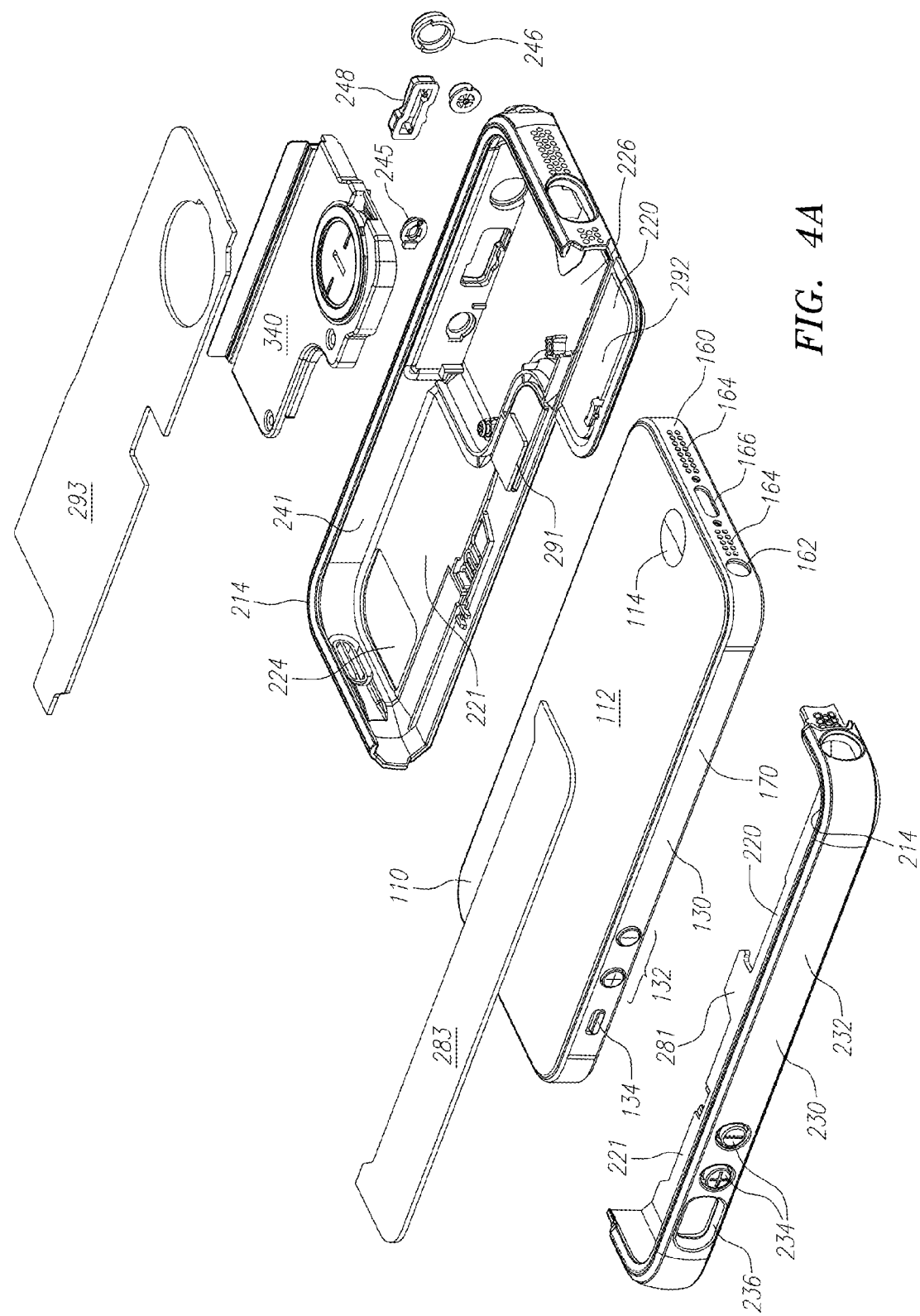
FIGS. 4A and 4B are partially disassembled front and back face views, respectively, of the two components of the enclosure illustrated in FIGS. 1A-1F, wherein the two components are separated and unlatched from one another and from the mobile phone.
Figure 4B:
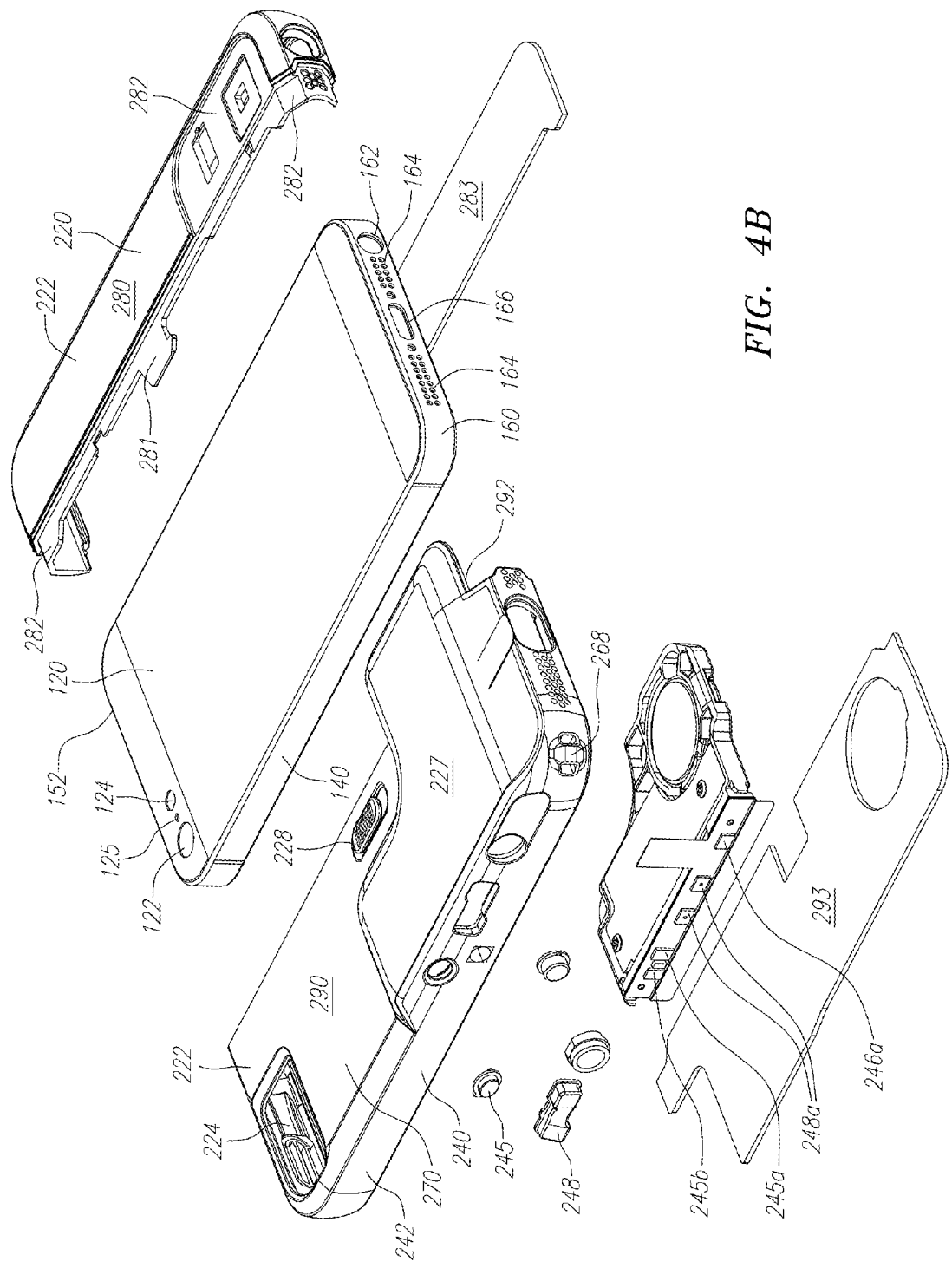

As best depicted in FIGS. 4A-4B, the mobile device 100 includes front and back faces 110 and 120, and a left side 130, a right side 140, a top side 150, and a bottom side 160 that together define the perimeter 170 of the mobile device 100. The front and back faces are flat and the sides have flat surfaces. The front face 110 includes a touchscreen 112 user interface, a home button 114 with biometric sensor, and speakers, front facing camera, and proximity sensors 116, 117 and 118 that are located at the top region of the front face 110 but are not shown in the illustrations. The back face 120 includes a camera lens window 122, a flash 124, and a microphone 125 that are grouped together in the top region at the upper corner on the right side of the phone 100. The left side 130 includes volume control buttons 132 and ringer silent switch 134 that controls whether or not the phone is on silent mode. The top side 150 includes a depressible power button (not shown) 152. The bottom side 160 includes a headphone jack 162, microphone grill 164, and a data and charging port 166.

The phone 100 includes, or can include by download, numerous features or applications including but not limited to cellular telephone, text messaging, email, music, GPS, maps, games, compass, music and camera feature. By some accounts there are over 300,000 applications for the iPhone. The camera feature, which is standard equipment for the iPhone, is controlled via a camera application that resides on the phone. The shutter control for the camera feature is activated by either pressing the plus ("+") volume control button on the left side 130 of the phone or tapping the camera shutter button image on the screen adjacent the home button 114. The camera lens 122 is located near the perimeter 170 at the same top end region of the phone as the volume control button 132 that controls the camera shutter. Thus, when using the plus volume control button to trigger or activate the camera shutter, it is not uncommon for one or more of the user's fingers to obstruct the camera lens 122. Alternatively, when using the shutter button in the camera application, it is not uncommon for users to hold the phone on one end (around the top side 150 where the camera lens window 122 is located) with only a single hand and press the shutter button on the other end (bottom side 160) near the home button 114 with the other hand. Because the user is only holding the phone with one hand, on one end of the phone, around the perimeter 170, the phone is often unstable, such that when the shutter button on the screen is tapped by the user it has a tendency to move. In either mode of camera operation, the quality of the photo can be significantly diminished or lost all together. As many smart phone users can attest, the experience can be quite frustrating.

The protective enclosure or case 200 for the mobile device 100 disclosed herein is capable of providing a solution to such frustration by moving the position of the user's interface control of the camera feature to a more ergonomically friendly position on the opposite side and end of the phone vis-à-vis the volume control buttons so that when taking photos the user can hold the camera securely with both hands and activate the shutter with the hand that is on the other end from where the camera lens is located, thus reducing the likelihood that the user's fingers will obstruct the camera lens window and/or flash 122/124 when the user activates the shutter.

As set forth above, FIGS. 1A-4B commonly illustrate various views of the protective case 200. As illustrated therein, the protective case 200 includes front and back face walls 210 and 220 and a left side wall 230, a right side wall 240, a top side wall 250, and a bottom side wall 260 that together form the perimeter 270 of the case that reside between the front and back faces. Each of the walls 210, 220, 230, 240, 250, and 260 are dimensioned to include a corresponding dimensioned surface to engage the front face and back face, and left, right, top and bottom sides 110, 120, 130, 140, 150, and 160 of the mobile device 100.

Figure 8:
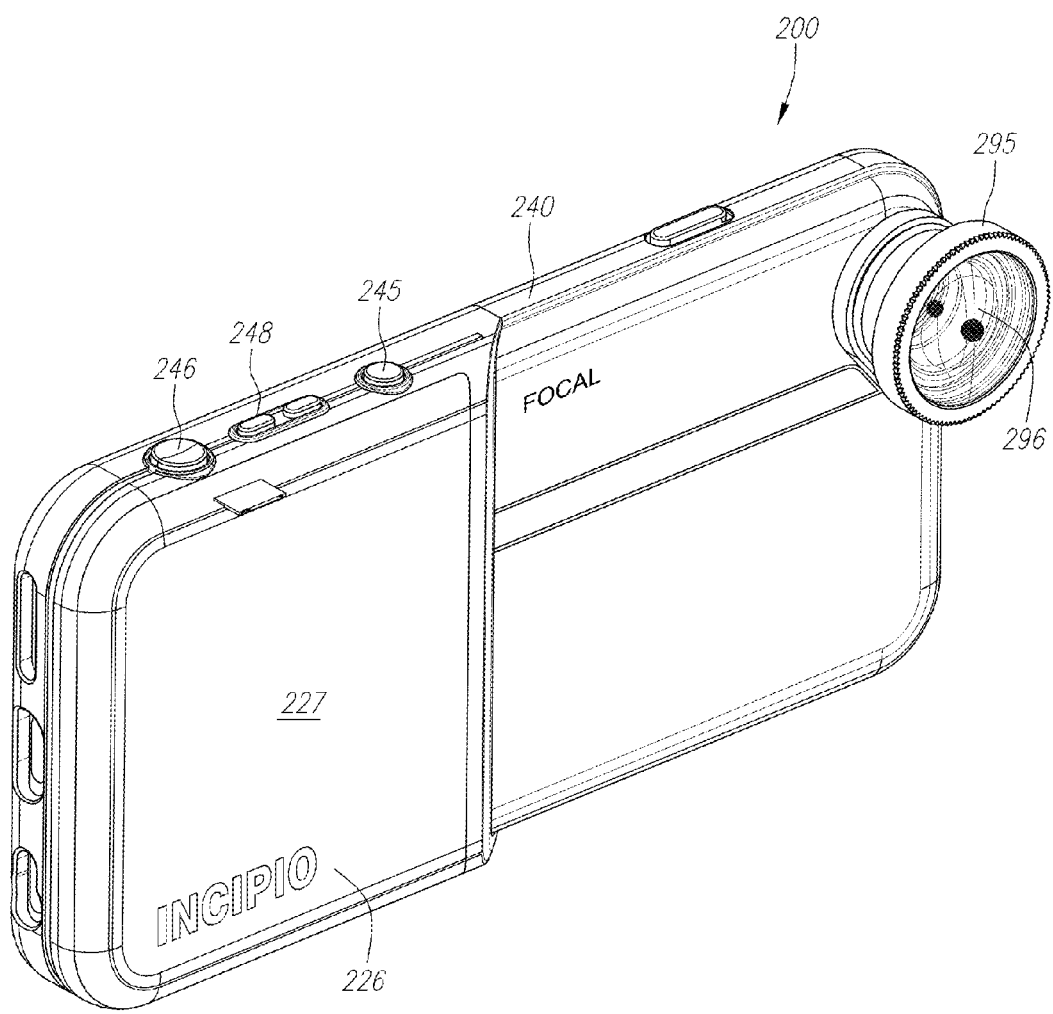
FIG. 8 is an illustration of another implementation of the protective case illustrated in FIGS. 1A-1F, wherein the grip is differently configured and the camera lens aperture includes a lens accessory that is attached thereto via threads or other suitable mechanical or adhesive means. The camera lens accessory may include for example one or more additional convex, concave, flat, or colored lenses that may augment the camera feature.

The front face wall 210 can comprise of an inwardly projecting rim 214, as best illustrated in FIGS. 3A-3B and 4A-4B having an inner and outer surfaces 212 and 211, respectively. The back face wall 220 is also defined by inner and outer surfaces 221 and 222 that includes a camera lens and flash opening or aperture 224. The opening 224 can be an aperture or may include a glass or transparent protective film, panel or fixture accessory. The accessory may be removable attached via a clips or screwed into a threaded aperture (as depicted in FIG. 8) and may be engineered to augment the photography. For example, the accessory 295 may incorporate one or more additional convex, concave or colored lenses 296 in the optical path of the camera lens on the mobile device as depicted in FIG. 8. The lens accessory may telescope in and out to allow the user to manually focus and or adjust the magnification or focal points of the one or more lenses contained within the accessory. In addition, the back face wall 220 includes a user wireless interface module compartment 226 that housed the user wireless interface module 300, described in more detail below, that can operate as a second set of controls for the mobile device. The outer surface 222 of the back face wall that overlies the module compartment 226 can be formed as a grip pad 227, that may include a textured exterior surface, for example, a surface made of pebbled leather or some other suitable material that is capable of providing goods grip to the user, that is aesthetically appealing, and/or visually distinctive from the adjacent outer surface 222 regions. Also included on the back face wall 220 is an unlock release switch 228, which is adapted to be user actuated to unlock the latch and lock mechanism that connects the two enclosure components of the protective case 200 so that they can be separated from one another.

As best illustrated in FIGS. 1C and 1D, 2A-2B, 3A-3B and 4A-4B, the protective case 200 includes left side and right side walls 230 and 240, each of which being defined by inner and outer surfaces 231, 232 and 241, 242. The left side wall 230 can further include volume control buttons 234 that are positioned, dimensioned, configured and adapted to interface and actuate the volume control buttons 132 on the mobile device 100. Also included in the left side wall 130 is an opening or aperture 236 that is positioned and dimensioned to correspond with the ringer silent switch 134 of the mobile device 100 to provide functional user access to the switch 134. The right side wall 240 includes the displaced user control 244 for the wireless interface module 300. In the implementation illustrated, the user controls 244 include a power button 245 that powers on and off the user interface module 300 and the Bluetooth interface. The power button 245 may be user programmable to have the dual function of being a shortcut means to provide user access to a desired or selected operation or feature or sub-feature of the mobile device 100. The user controls 244 also include a shutter activation button 246 that controls the activation of the shutter of the mobile device camera feature and a rocker switch 248 that controls the zoom-in and zoom-out of the mobile device camera feature. It should be understood that the user control 244 buttons 245, 246, and 248 may be implemented using any type of button such as the physical buttons illustrative or the touch sensitive button such as capacitive type button or any combination thereof.

As best illustrated in FIGS. 1E and 1F, 2A-2B, 3A-3B and 4A-4B, the protective case 200 includes top side and bottom side walls 250 and 260, each of which being defined by inner and outer surfaces 251, 252 and 261, 262. The top side wall 250 includes a mobile device power button 254 positioned, dimensioned, configured, and adapted to interface with the power button 152 on the mobile device 100. In the implementation illustrated the button 254 resides within an aperture 255 and is connected in a levered manner 256 to top side wall 250 at one end of the aperture 255, such that when pressed, the button 254 hinges around the lever connection. The bottom side wall 260 includes perforated regions 264 positioned and dimensioned to correspond with the microphone grill 162 regions on the mobile device 100 and headphone jack and data/charging port apertures 266 and 267 that are positioned and dimensioned to correspond with the headphone jack port 162 and the data and charging port 166, respectively, of the mobile device 100 to provide the user with functional accessibility thereto. The bottom side wall 260 also includes an attachment ring 268 located in the right side corner that is configured and dimensioned to receive an adjustable lanyard 269 (not shown) that can be strapped around the users hand to provide added security against dropping the device when in use such as when taking a photograph. Collectively the side walls 230, 240, 250 and 260 define a perimeter 270 between the front and back faces 210 and 220 of the protective case 200.

In the implementation illustrated, the case 200 is configured so as to be comprised of two primary components, a first component 280 and a second component 290, that when mated with one another are locked into position via a locking mechanism. The locking mechanism is comprised of a latch 281, located on the first component 280 and a lock 291 located on the second component 290. The two components 280 and 290 are separable from one another by the user actuating the release switch 228 that unhinges the lock 291 from the latch 281 to allow the user to slide apart the two components 280 and 290. The first and second components 280 and 290, each include either the left or right side wall 230 or 240 and portions of the front face, back face, top and bottom walls 210, 220, 250 and 260. It should be understood, however, that it is contemplated that the first and second components 280 and 290 may include any of the various walls components and that the enclosure may be comprised of a single component or more than two components and may or may not completely encircle the perimeter 170 of the mobile device 100.

The first and second components 280, 290 are configured such that their respective mating regions include respective overlapping sections or regions 282 and 292 as best illustrated in the exploded views illustrated in FIGS. 3A-3B and 4A-4B. Each of the components 280 and 290 may be formed of any suitable material including plastics/polymers, metal, fiber reinforced plastic, reinforced fabric or leather or combination thereof to provide sufficient protection. Various combinations of materials are thus contemplated. In the implementation illustrated, for example, it is contemplated that the walls of the second component 290 be formed of polycarbonate and the smaller first component 280 may be formed of a mixture of acrylonitrile butadiene styrene (ABS) and polycarbonate (PC) to facilitate a brushed aluminum or titanium finish on the outer surface of that component. The in mold lamination process that creates the desired metallic finish does not work well with just PC but does work well with a mixture of ABS and PC. The construction of the walls of the components 280 and 290 may be manufactured via an injection molding process or any other suitable molding or construction process.

Figure 3A:
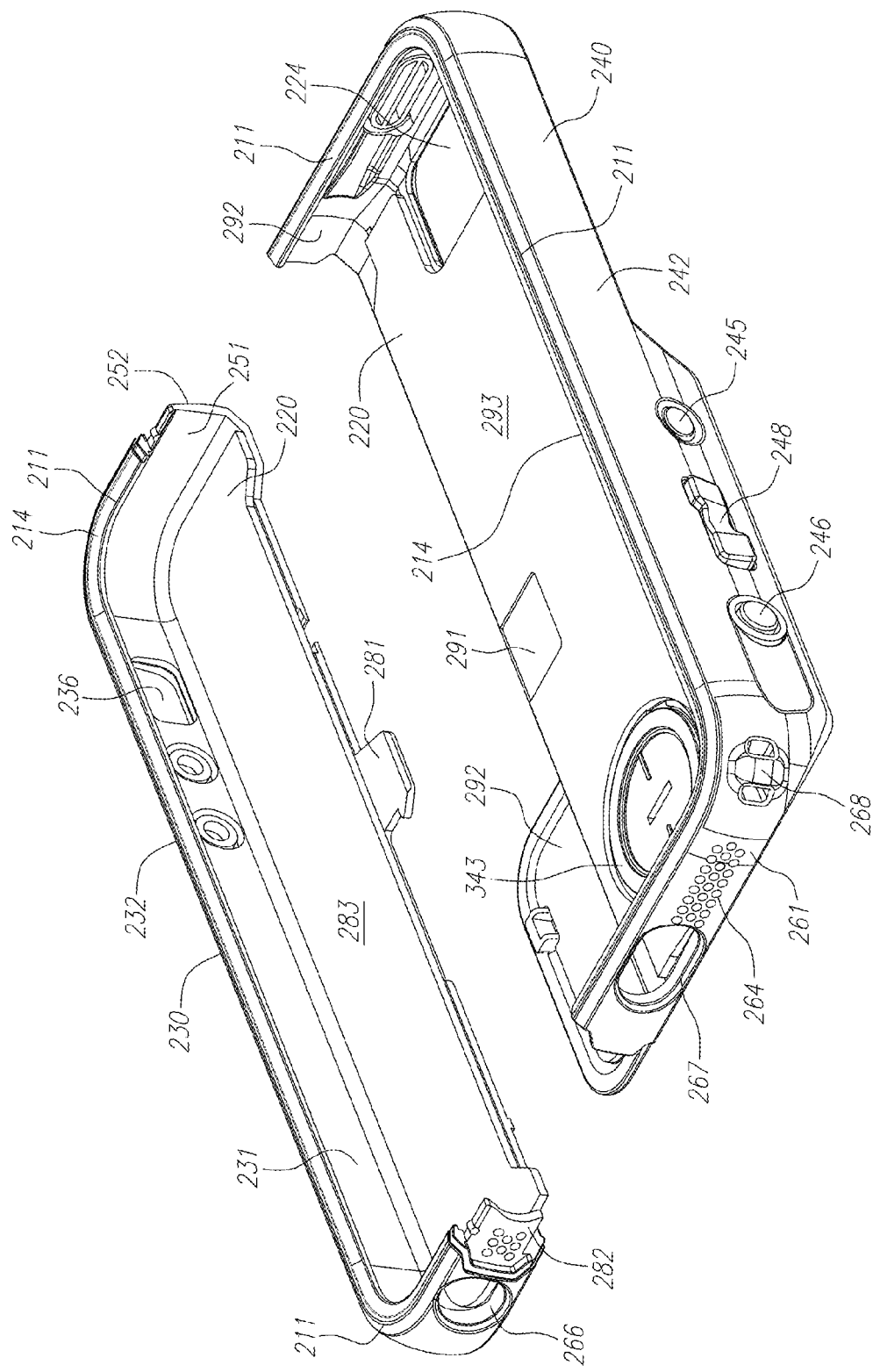
FIGS. 3A and 3B are front and back face perspective views, respectively, of the two components of the enclosure of the protective case illustrated in of FIGS. 1A-1F, wherein the two components are separated and unlatched from one another and the mobile device is not shown to better illustrate the latching mechanism and the interior of the case.
Figure 3B:
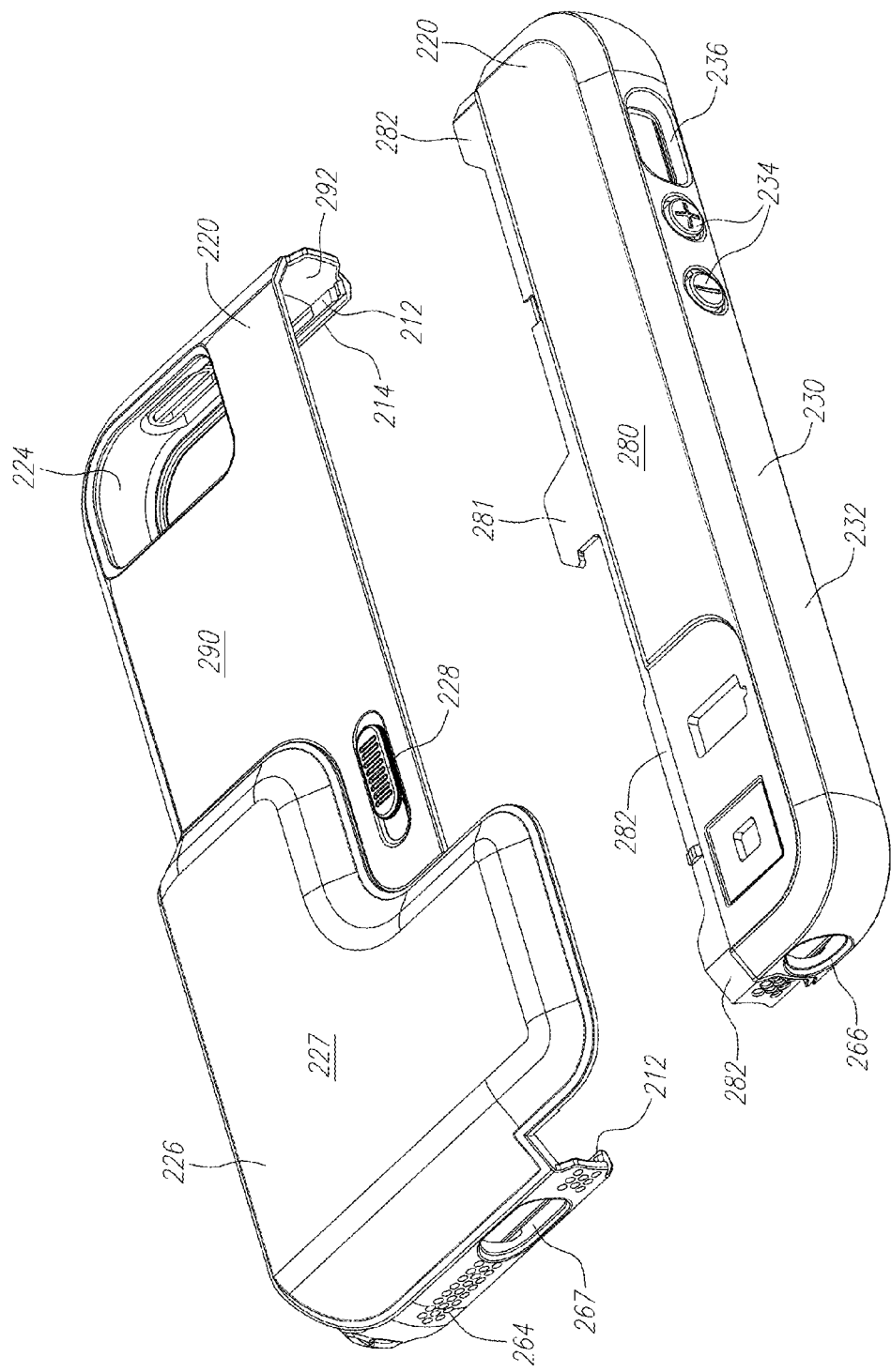

As illustrated in FIGS. 3A and 4A-4B, each of the components 280 and 290 includes a cushioning pad 283 and 293 that is made of a suitable cushioning material such as ethylene vinyl acetate (EVA) or the like that resides or overlies the respective inner surface 221 regions of the back face wall 220 on each of the components 280 and 290. The second component 290, as previously noted, also includes the user wireless interface module compartment 226 that contains the wireless user interface module 300.

Figure 5A:
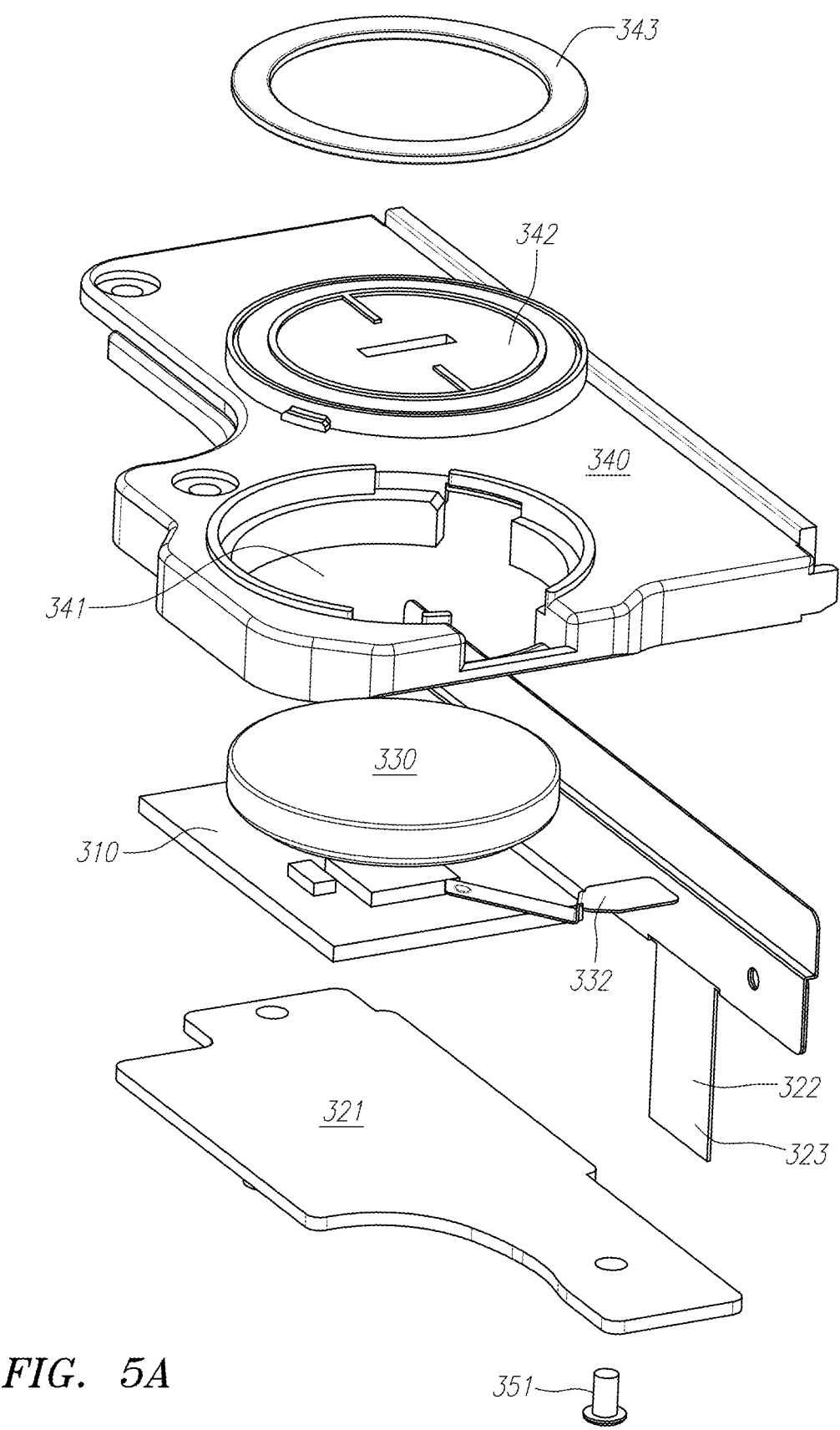
FIGS. 5A and 5B are opposing perspective views of a partially disassembled user interface module of the case illustrated in FIGS. 1A-1F that illustrates the assembly and component thereof.
Figure 5B:
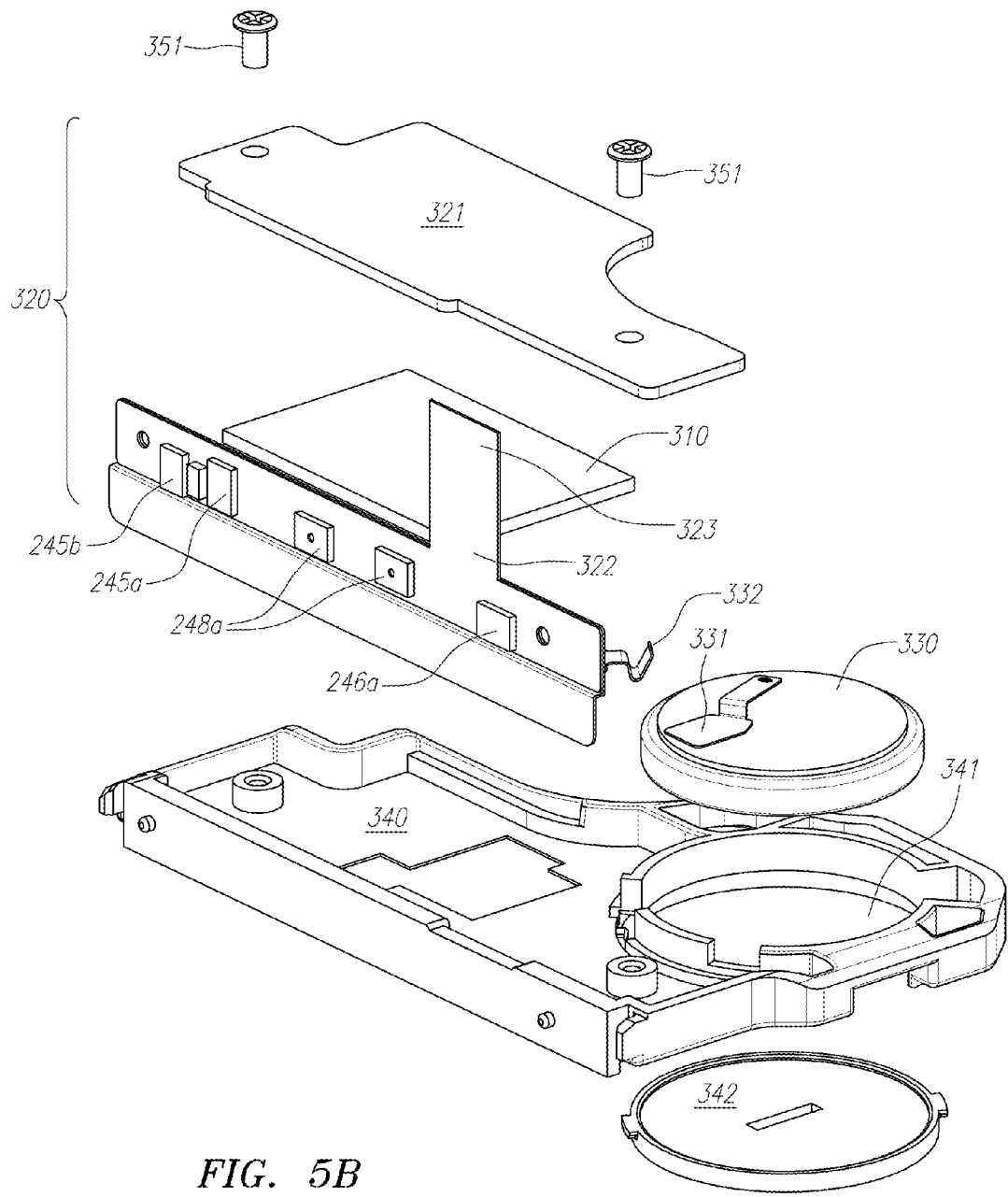

As best illustrated in FIGS. 5A-5B, the wireless user interface module 300 includes a Bluetooth module 310, printed circuit board(s) (PCB) 320, a power supply such as a battery 330, and user controls 244. While power to the user interface module 300 may come from a dedicated battery 330, it is also contemplated that the case 200 and the user interface module 300 may be powered by the power supply on the mobile device 100 itself by electrical connection there-between. The Bluetooth module 310 is selected to be capable of wirelessly interfacing with the mobile device 100 and may be a Bluetooth Low Energy module.

The printed circuit board 320 is in the illustrated implementation formed of two parts—a rigid PCB component 321 to which the Bluetooth module 310 is mounted and a flexible PCB component 322 that is connected to the rigid PCB component 321 via a connection segment 323 that is flexed into position and soldered to the main rigid PCB component 321. The flexible PCB component 322 includes buttons and toggle switch connections 245*a*, 246*a* and 248*a* that interface with the corresponding buttons 245 and 246 and toggle switch 248. One or more of the user buttons may include an LED as a visual state indicator to the user. For example, the power button 245 may include a connection 245*b* on the PCB component 322 that includes or is otherwise connected to a blue LED 247 that lights up when the wireless module 300 is powered or in the "on" position to reflect that the Bluetooth interface is paired with the mobile device.

The module 300 is contained within a bracket compartment 340 and the inner surface 221 of the back face wall 220 that forms the module compartment 226. The rigid PCB component 321 is secured to the user interface module compartment 226 on the back face wall 220 of the enclosure 200 via screws 351 that secure the module to threads that are molded into the underside of the bracket compartment 340, which is in turn attached via screws to threads that are molded into the inner surface 221 of the back face wall 220. It should be understood that while screws and threads are used, other attachment means, such as clips, adhesive, snaps, soldering, etc. may be employed to facilitate the foregoing attachments.

To facilitate access to the battery 330 without removal of the entire module, the bracket compartment 340 contains a battery aperture 341 that is fitted with a user removable battery cover 342 that can be twisted-off or unscrewed from the bracket to gain access to the battery 330. A cushion ring 343 can be positioned over the battery cover 342 to provide additional cushioning to the mobile device 100 when the case 200 is attached thereto. The battery 330 is positioned within the battery compartment and electrically connected to the rigid portion of the PCB 321 via a metallic battery bracket 331 and battery clip 332.

The user interface module 300 including the PCB 320 (321 and 322), Bluetooth or wireless interface module 310, and battery 330 together with the buttons 245, 246 and 248 can be configured or designed to be a standalone user removable component from the case 200. For example, for example the entire user interface module depicted in FIGS. 5A-5B (including buttons 245, 246, and 248) may be in the form of a control panel or tray that slides out from the right side 240 of the interface module compartment 226 of the case 200. Alternatively, it is contemplated that the entire interface module compartment 226 together with user interface module 300 may be mechanically attached via latches, clips, a tray (the user interface module) and rail (embedded on the case 200) mechanism or any suitable reversible attachment means or mechanism that would allow the user to remove the user interface module 300 component from the case 200, without removing the case 200 (either component 280 or 290) from the mobile device 100 to maintain full protection of the mobile device 100. In either alternative implementation, the user can use the interface module 300 to control the mobile device 100 remotely from the case 200 while components 280 and 290 continue to be attached to and protect the mobile device 100.

Figure 6:
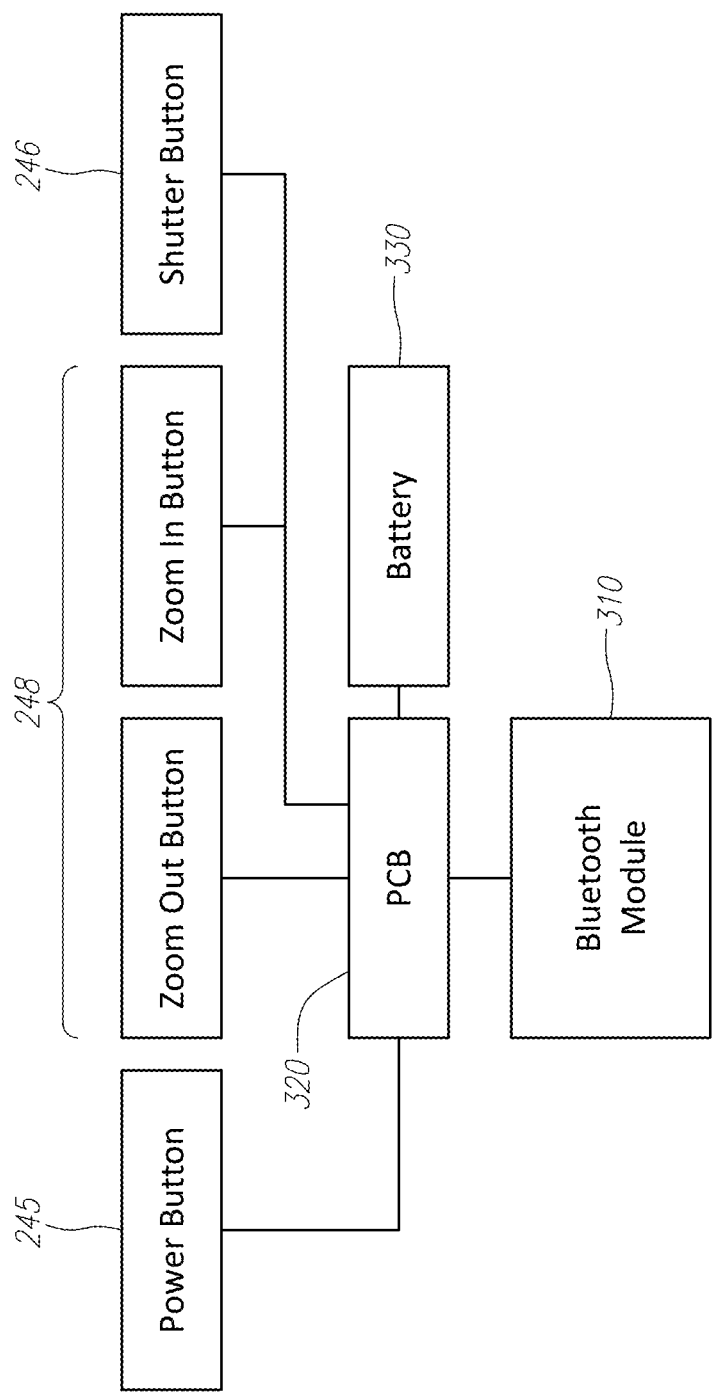
FIG. 6 is a block diagram illustrating the inter-relationship of components of the user interface module of the protective case illustrated in FIGS. 1A-1F.

The block diagram in FIG. 6 further illustrates the electrical connections between the various components of the wireless user interface module 300. As depicted therein, each of the user interface buttons or inputs 245, 246 and 248 are directly connected to the PCB 320, which receives and processes inputs from those buttons to control the camera feature on the mobile phone 100 via the Bluetooth module 310 which is paired to the Bluetooth interface on the mobile phone 100. The battery 330 is also connected to the PCB 320 and in particular the rigid PCB component 321 and provides power to the wireless interface module 300 via the PCB.

Figures 1A, 1B:
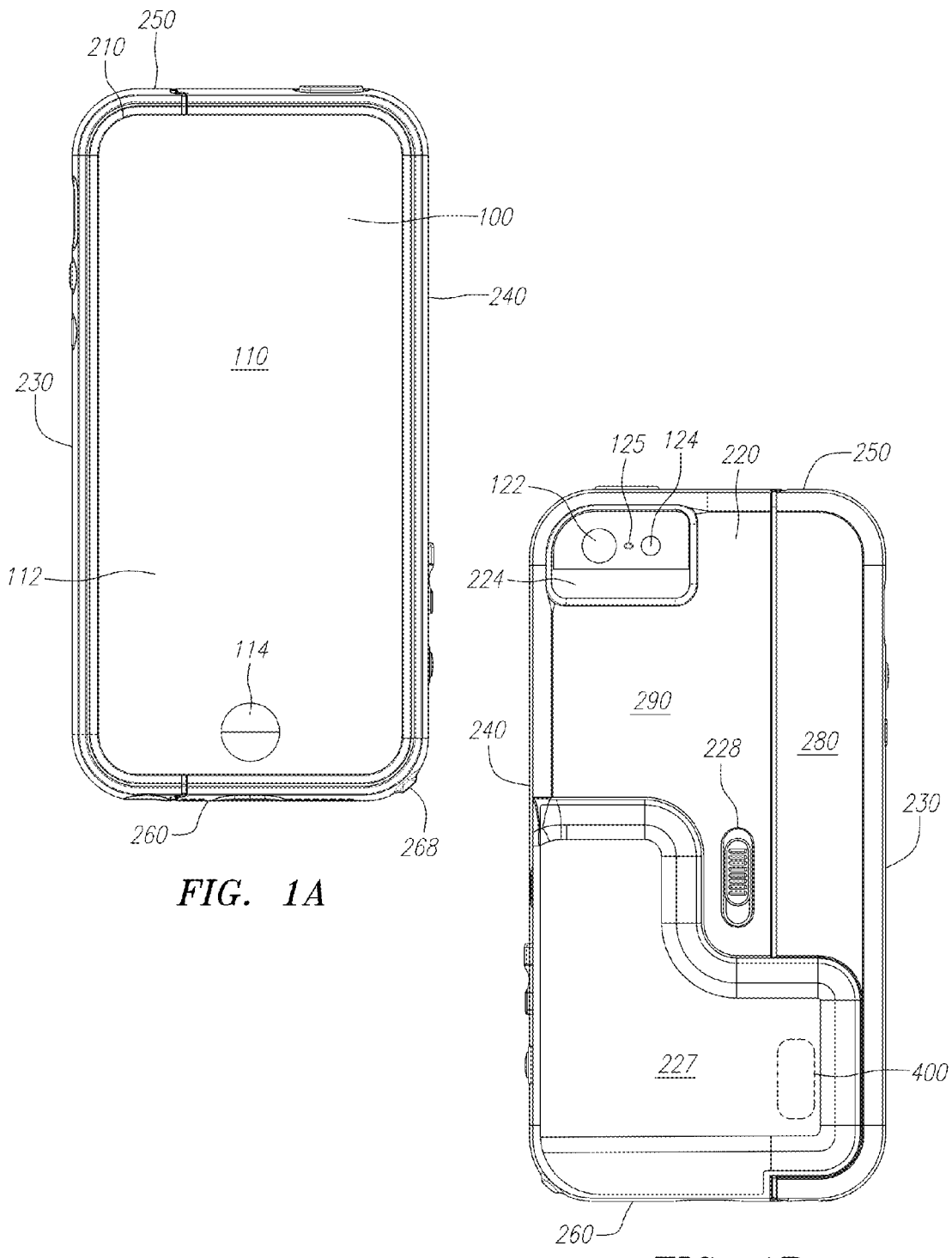
FIGS. 1A-1F are in order front face, back face, left side, right side, top side and bottom side views of a protective case for a mobile device. The mobile device depicted in the illustration is a depiction of an Apple iPhone 5s mobile phone.
Figure 1C:
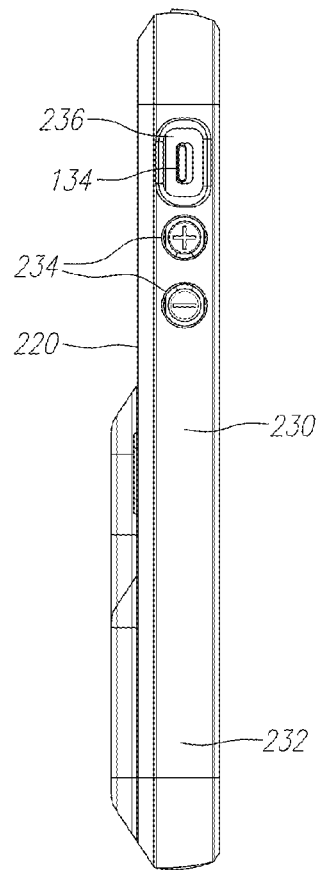
Figure 1D:
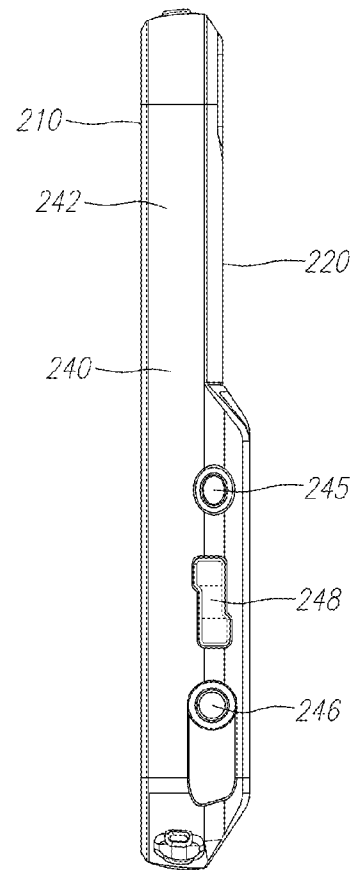
Figure 1E:
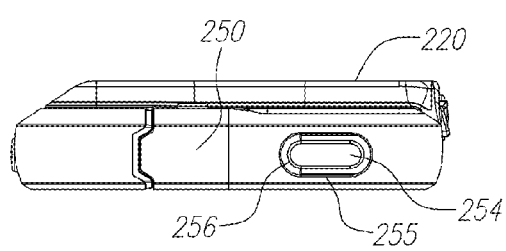
Figure 1F:
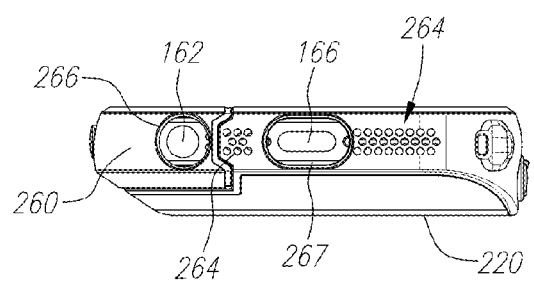
Figure 2A:
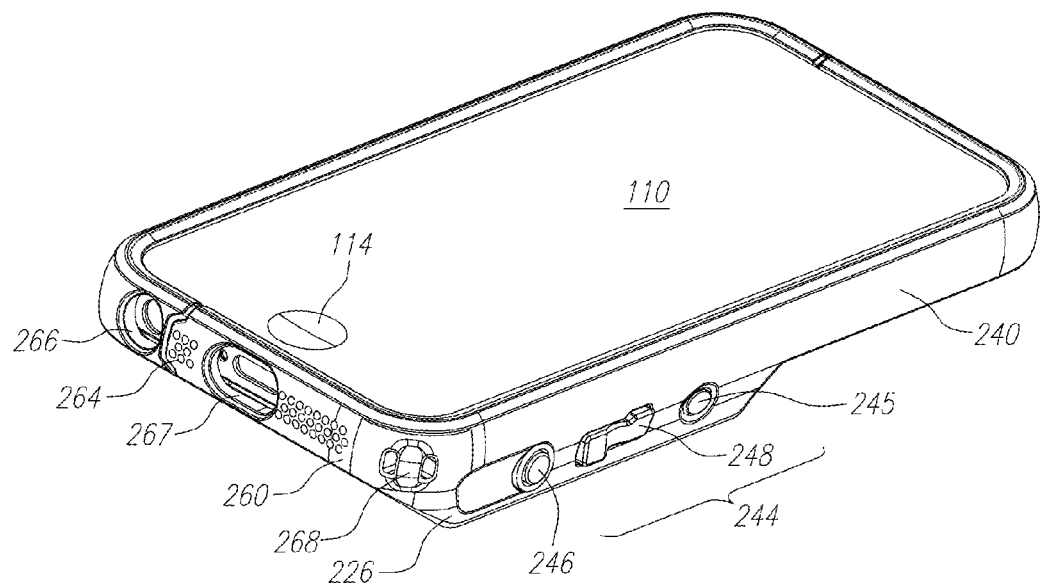
FIGS. 2A and 2B are front and back face perspective views, respectively, of the protective case and mobile device illustrated in FIGS. 1A-1F.
Figure 2B:
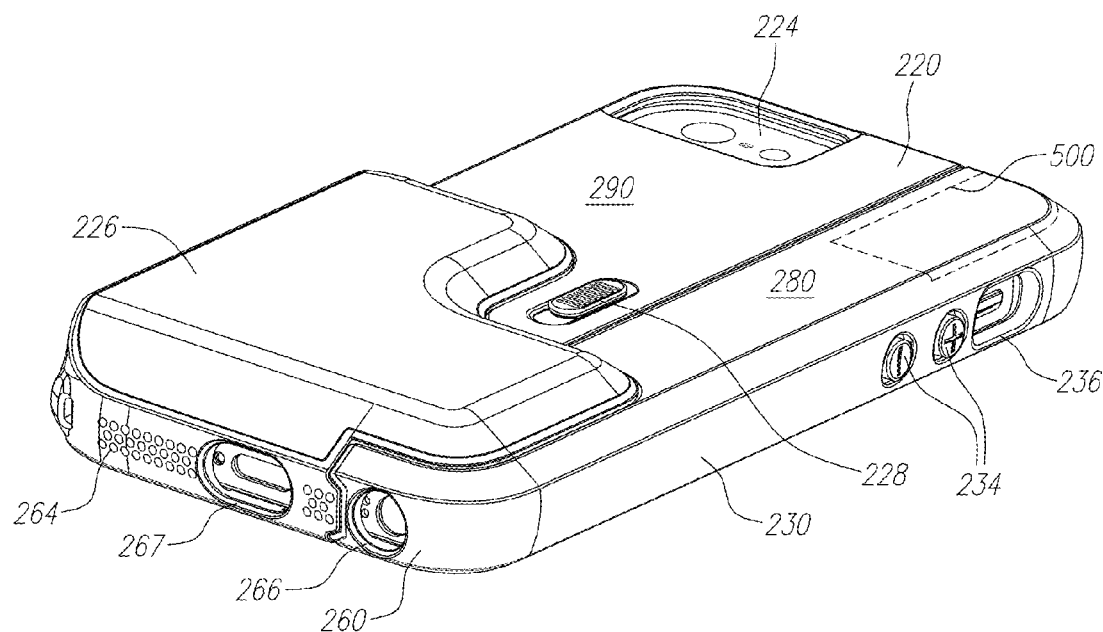

The case 200 may further include an additional flash/lamp feature 400 (illustrated in shadow in FIG. 1B) that is powered by battery 330 or a different or dedicated battery contained within the case 200. The flash/lamp 400 may be remotely positioned or displaced from the flash 124 on the mobile device 100 as illustrated in FIG. 1B. The flash/lamp 400 may be controlled or triggered with the operation of the camera shutter activation or independently therefrom via the one or more of the user interface controls 244. When used in connection with the camera or shutter operation the flash/lamp 400 may act as a camera flash at a displaced angle from the flash 124 on the mobile device 100, which may improve the quality of the lightening and hence the photographs taken by the camera feature on the phone. Alternatively, the flash/light 400 may be used as a standalone flashlight or lamp. Lamp and flash mode may be used even if the case (or a component thereof) is unsecured to and displaced from the mobile device 100.

The protective case 200 may also include a stand 500 (shown in the closed position in shadow in FIG. 2B) on component 280 to allow positioning of the mobile device either on end or longitudinally at the desired angle relative to the supporting surface. In operation, the stand 500 may be configured to function like a kick-stand commonly used for bikes and may have a supporting edge that can be hinged away from the case and extended as needed to provide the requisite support to maintain the phone in the desired position. When the two components 280 and 290 are unlocked and separated, the user can position the mobile device 100, which is retained within component 280 at one location, while retain possession of the component 290 that includes the wireless user interface control 244 so that the user can remotely control the operation of the mobile device 100 such as the operation of the camera shutter and zoom control of the camera. This would allow the user to take self-portraits at a distance by using the wireless Bluetooth control contained within one of the components 290 of the enclosure while using the stand on the other component 280 to position the mobile device 100 in the desired location and direction and then use the Bluetooth control contained within component 290 to snap the photo. In this regard, it should be understood that each of the components 280 and 290 are capable of being independently attached to the mobile device 100 securely by virtue of their configuration, dimensions and materials that hold the mobile device within each component with pressure and friction between the inner surfaces of the component and the mobile device. In this respect, the EVA padding components 283 and 293 may serve to bias the mobile device 100 against the inner surface 211 of the rim 214 of the front face wall 210 to create a secure fit.

The operation of the case 200 can be facilitated via a user interface that is provided by a software application that interfaces the wireless user interface control on the case with the operations of the mobile device 100. The user interface software may be provided by the manufacturer of the case 200, a third party, such as Instagram® or by the manufacturer of the mobile device 100, such as Apple. Interfacing between the wireless user interface control 300 and the mobile device 100 may also be accomplished through the operating system of the mobile device 100, to the extent that the operation, (e.g., camera feature), is part of the operating system of the mobile device 100. Thus, it should be understood that the functionality of the wireless user interface control on the case 200 may accomplished through the interface with the application programming interfaces (APIs) of the mobile device, so that the case 200 may be immediately operable with the mobile device 100 straight out of the box once wirelessly connected or paired with the mobile device.

By way of example, wireless and displaced control from the user interface module 300 of the case 200 of a camera feature of the iPhone 5s mobile device will be described. To the extent necessary, a camera interface software application is first loaded on to the mobile device 100. The loading can be done by the retailer or manufacture of the mobile device 100 so that the device comes pre-loaded with a suitable interface application, or may be an application from another (e.g., the camera case manufacturer or third party) that is loaded on to the mobile device 100. The application may be compatible with any of a number of operating systems including the Apple iOS and Google Android operating systems. In the case of the iPhone 5s, the application would be compatible with the Apple iOS operating system. The application may use the basic camera framework (e.g., the AVfoundation.framework) that is native within the iOS software development kit ("SDK").

Each button or switch on the user interface can be mapped to a core function within the basic framework to accomplish various actions. The four main buttons 245, 246 and 248 (which has two electrical buttons one for each side of rocker switch) each have specific pre-assigned actions or functions that control the application interface. The power button 245 may also be assigned an additional function that can be programmed by the user through the interface application.

The primary function of the shutter button 246 is to activate camera shutter to take pictures and start/stop video taken from the camera feature. The corresponding iOS action is "(void)TakeSnapNow." The capture action is dependent upon the capture mode selected by the user through the menu choices. For example "selecting video mode" will start and stop a video, selecting 'burst mode" will take a rapid selection of three image stills, or selecting basic camera mode will allow the user to take a single photograph at a time.

The primary functions of the power button 245 is to turn "on" or power "on" and "off" the case 200 and pair the wireless user interface module 300 within the case 200 with the mobile device 100. Pressing and releasing button turns on the power and holding the button down for an extended time (e.g., 4 seconds or more) turns off the case 200 and disconnects the Bluetooth connection between the case 200 and the mobile device 200. The secondary function of button 245 is to allow the user to program this button as a "hotkey" for setting or selecting various user options within the user menu and submenus.

Figure 7A:
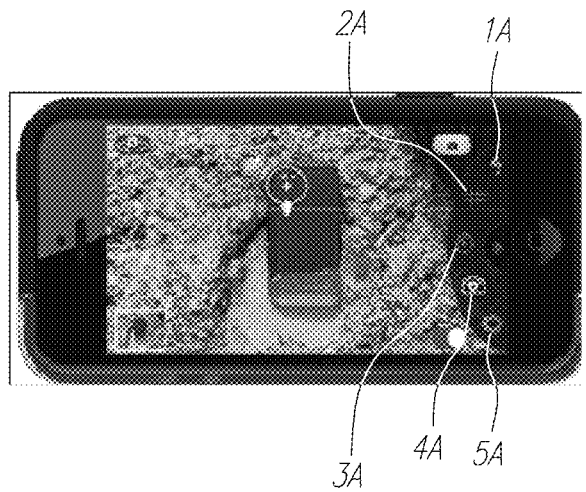
FIGS. 7A-7E are illustrations and corresponding descriptions of various representative screen shots of the user interface of the interface software application that facilitates the interaction between the wireless user interface control on the case with the operations of the mobile device and in particular the camera feature on the mobile device.

As illustrated in FIG. 7A, the application user menus may include:

1. Flash:
   Automatic: Flash automatically turns on or off for best lighting depending on detection of ambient lighting;
   Flash On: Flash will always fire with capture
   Flash Off: Flash will never fire with capture
   Bulb/Lamp: Light will remain on indefinitely (lamp mode)
2. Grid/Level Toggle: Turns on/off grid lines and level arrows on the mobile device screen to allow the user to properly position and align the image before capturing it.
3. Shutter/Capture:
   1×: Capture one single shot (regular mode)
   3-sec timer: A timed, three-second shot
   10-sec timer: a timed, ten-second shot
   Burst: Capture a burst of three rapid fire shots with one button press of the shutter button 246.

4. Camera/video Toggle: Allows user to toggle between camera and video mode

5. User Settings: As illustrated in FIG. 7C, the user settings allow the user to configure the programmable button 245 view battery life of the case 200 battery 330 and, select the length of time before the case time outs or automatically disconnects from the mobile device to save battery power.

The return arrow on the main navigation menu allows the user to go back one level on the user menu.

Figure 7B:
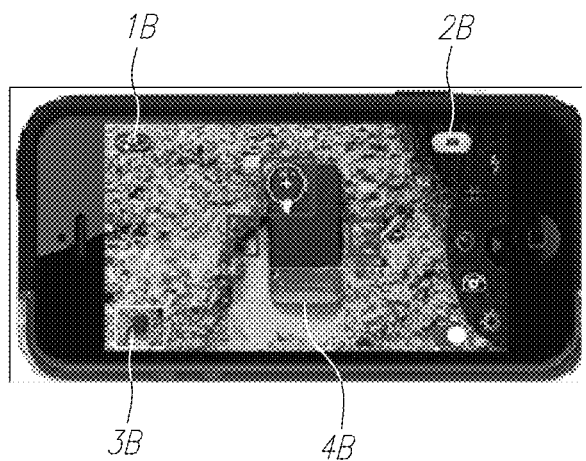
Figure 7C:
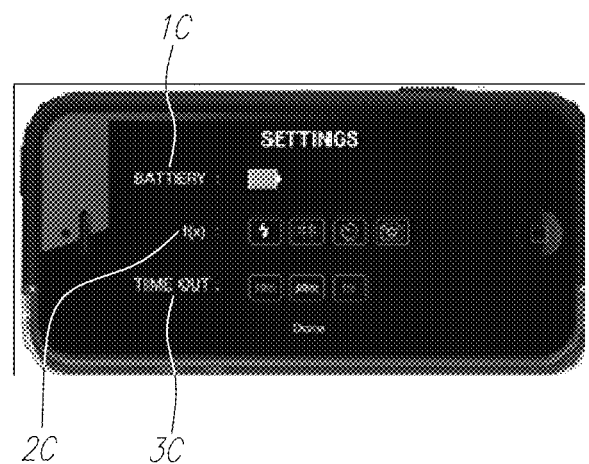

In addition to the user menu, the application includes other basic user interface buttons, such those illustrated in FIG. 7B, including:

1. Camera Capture Button—an in-application action that allows the user to activate the shutter function user the touchscreen button generate by the application.

2. Camera Flip Button—allows user to choose between front-facing and rear-facing cameras 3. Image Preview Window—provides a snapshot of the previous picture. Taping the image preview window opens an image editing feature illustrated in FIG. 7E.

4. Level Arrows—arrows that show one color when the phone is level and another when the phone is not to assist the user to take level photos, 5. Focal Point Circle (FCP)—allows the user to press and hold the FCP, the user can drag with a finger the FCP to any point on the screen to set the focal point of the image. The user may tap the screen to set the depth of field The rocker switch 248, which comprises two electrical buttons 248a on either end of the rocker switch, controls via the application the camera zoom-in and out and the scaling of the camera view in the touchscreen window of the mobile device 100.

Figure 7D:
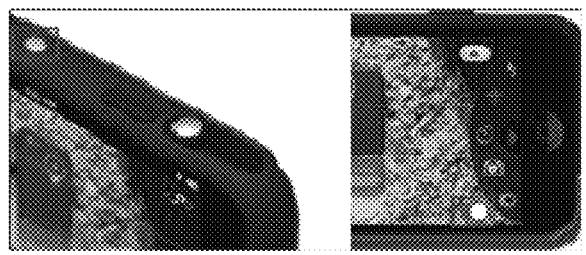
Figure 7E:
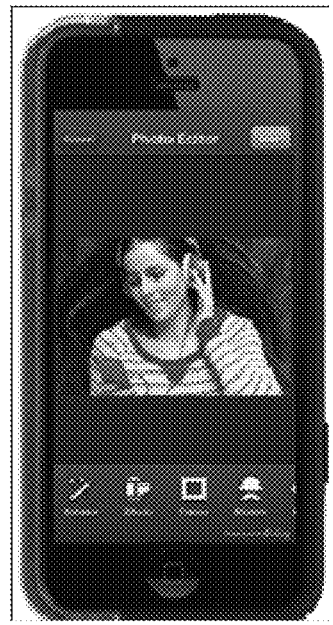

As illustrated in FIG. 7D, once the application is loaded on the mobile device 100, the user interface module 300 is paired with the mobile device 100 via the Bluetooth wireless interface. Pairing is made by first placing the Bluetooth interface module 310 into advertising or active mode by pressing the power button 245. Once powered the blue LED 247 will flash blue to indicate that the case 200 is ready to pair with the mobile device 300. When the case is in pairing mode, the user opens the camera interface software application on the mobile device 100. The application presents the user with an indicator button or slider that the user can activate to wirelessly connect the mobile device 100 to the case 200 and in particular the wireless interface module 310. The indicator slider may be in a white/blue color configuration such that when activated and paired the slider will be blue and when not activated and unpaired the slider will be white in color. Once paired, both the blue power LED 247 and the indicator on the phone will remain active blue. Further descriptions of FIGS. 7A-7E are provided in the following table.

| FIG. No. | Description |
|---|---|
| 7A | Main Menu Options (Right-side navigation):<br>(1A) -- Flash: customize flash settings per shot.<br>(2A) -- Grid/Level: Turn on/off grid and level arrows for alignment assistance.<br>(3A) -- Shutter Mode: Select shutter type for capture mode.<br>(4A) -- Camera/Video Mode: toggle between camera and video capture mode.<br>(5A) -- Settings: configure programmable button 245. |
| 7B | Basic UI/Main View:<br>(1B) - Camera Capture Button: In-app action to activate the shutter function. |
| | (2B) - Camera Flip Button: choose between front-facing and rear-facing camera.<br>(3B) - Image Preview: A snapshot of your previous picture. Tap to open up the Image Edit view, where user can apply filters, crop, add stickers and borders, blur and many more effects.<br>(4B) - Pink/White Level Arrows: arrows will show pink when the phone is level and white when not level - Focal Point Circle: press and hold, then drag your finger on any point of the screen to set the focal point of your image. Tap on an item near to you or select far away to set depth of field. |
| 7C | Settings Menu:<br>(1C) - Battery: Displays current battery life of the Case (not iPhone battery).<br>Values: Green = Excellent, Yellow = Good, Orange = Fair, Red = Poor/Low.<br>(2C) - f(x): Function/Programmable button (button 245). Program one action for quick selection.<br>Flash: set to toggle between flash selections.<br>Grid On/Off: set to toggle grid on/off.<br>Timer: set to toggle between timed/single/burst shots.<br>Camera/Video: set to toggle between camera and video modes.<br>(3C) - Time Out:<br>Auto-Timeout: Select an option to automatically disconnect the case from the phone after a period of inactivity. This helps preserve the case battery life by not consuming battery when inactive.<br>10 m: Set auto-disconnect to 10 minutes of inactivity.<br>30 m: Set auto-disconnect to 30 minutes of inactivity.<br>1 hr: Set auto-disconnect to 1 hour of inactivity. |
| 7D | Pairing via Bluetooth Low Energy:<br>The Case is paired with the iPhone 5 or 5s via Bluetooth Low Energy (BLE).<br>Pairing is made by first entering the case (Bluetooth Peripheral) into advertising mode.Press the power button 254 once. The power indicator LED will flash blue, showing that the case is ready to pair.<br>When the case is in pairing mode, open the App on the iPhone 5/5s.<br>Tap on the Bluetooth slider once to connect the iPhone 5/5s (Bluetooth Central) to the case.<br>Once paired, both the blue power LED and the white/blue slider will remain active Blue. |
| 7E | Image Editing View:<br>image editing view allows users to add custom image filters, adjust brightness/contrast/warmth settings, add blur effects, and crop images, place stickers and create image borders. |

Once connected the user may take photos and zoom in and out using the displaced wireless control on the case 200 to operate the camera feature on the mobile device 100. The camera interface application may be used in the manner described to set above. For example, the user may use both or a single hand to hold the device and manipulate the shutter, zoom, and select the desired options (e.g., flash, grid, camera/video, time out, etc.) with the programmable hotkey controls. The user can further secure the device and improve safety when using the device by strapping the lanyard or wrist-strap around the wrist when in use or while carrying thus avoiding damage from dropping the device unintentionally. The user controls 244 can be used remotely to control the mobile device 100, when the device is in, all or part of the, case 200 or entirely removed from the case 200 altogether. For example, the user controls 244 can be comprised of a button panel that is user removable from the case 200, so that the mobile device can remain fully protected in the case 200 within the two components 280 and 290, while the user holds the button board, which may be contained within a removable grip pad 227. The user can then can activate the operations of the mobile device 100 remotely such as the (camera shutter, timer and zoom). Alternatively, one of the components 280 may remain on the mobile device 100 to provide some protection and/or positioning of the mobile device 100, while the other component 290 may be remote from the mobile device 100 and used to control the operations (e.g., camera feature) of the mobile device 100. While the camera/video feature has been described other features such as volume control, emergency call features etc. can also be similarly controlled by the user control interface provided by the case.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the inventive aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A user removable protective case for a mobile phone, wherein said phone includes a front face and a back face, a perimeter defined by a top, bottom, right, and left sides that reside between the front and back face, and a first user interface that controls a first operation of the mobile phone, said protective case comprising:
   a user removable enclosure configured to receive the mobile phone;
   said enclosure including a second user interface that is adapted to wirelessly interface with said mobile phone and control said first operation of the mobile phone; and
   wherein said first operation of the mobile phone is a shutter control for a camera feature built into the mobile phone wherein said second user interface is adapted to wirelessly interface with said mobile phone and control said first operation of the mobile phone without said phone being received within said enclosure.

2. The protective case of claim 1, wherein said second user interface is displaced to reside on a different side of said phone than said first user interface.

3. The protective case of claim 1, wherein said enclosure is comprised of multiple components, each of which are configured to surround at least portions of the perimeter and back face and releasably interlock with one another.

4. The protective case of claim 1, wherein said enclosure is comprised of a first component, and wherein said first component being configured to surround a first perimeter region of the mobile phone that extends on multiple sides of the mobile phone.

5. The protective case of claim 4, wherein said enclosure further comprising a second component configured to surround a second perimeter region of the mobile phone and adapted to being detachable from the first component.

6. The protective case of claim 5, wherein said first and second components, when positioned around the phone, are configured to mate with each other in at least one region.

7. The protective case of claim 5, wherein said first and second components, when positioned around the phone, are configured to latch and lock to one another.

8. The protective case of claim 5, wherein said first and second components, when positioned around the phone, are configured to cover a back face region of the device without obstructing a camera lens on the back of the phone.

9. The protective case of claim 1, wherein said enclosure further includes a camera flash.

10. The protective case of claim 1, wherein said enclosure includes a stand configured to support the case on edge on a flat surface at an angle of less than ninety degrees as measured by the angle formed beneath the phone and the region of the flat surface underlying the phone.

11. The protective case of claim 1, wherein said second user interface is detachably connected to a first component of the user removable enclosure of the case.

12. The protective case of claim 1, wherein said removable enclosure includes an aperture that is configured to reside adjacent a camera lens of the mobile phone device and a lens accessory secured to said aperture that includes one more lenses that are configured to be positioned within the field of view of the mobile device camera.

13. A user removable protective case for a mobile phone, wherein said phone includes a front face and a back face, a perimeter defined by a top, bottom, right, and left sides that reside between the front and back face, and a first user interface that controls a first operation of the mobile phone, said protective case comprising:
   a user removable enclosure configured to receive the mobile phone;
   said enclosure including a second user interface that is adapted to wirelessly interface with said mobile phone and control said first operation of the mobile phone; and
   wherein said first operation of the mobile phone is a zoom control for a camera feature built into the mobile phone wherein said second user interface is adapted to wirelessly interface with said mobile phone and control said first operation of the mobile phone without said phone being received within said enclosure.

\* \* \* \* \*